(12) United States Patent
Frye

(10) Patent No.: US 9,096,234 B2
(45) Date of Patent: Aug. 4, 2015

(54) METHOD AND SYSTEM FOR IN-VEHICLE FUNCTION CONTROL

(71) Applicant: General Motors LLC, Detroit, MI (US)

(72) Inventor: Mark S. Frye, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 212 days.

(21) Appl. No.: 13/682,235

(22) Filed: Nov. 20, 2012

(65) Prior Publication Data

US 2014/0142805 A1    May 22, 2014

(51) Int. Cl.
| | |
|---|---|
| H04W 48/02 | (2009.01) |
| H04W 48/08 | (2009.01) |
| B60K 35/00 | (2006.01) |
| B60W 50/08 | (2012.01) |

(52) U.S. Cl.
CPC ............. *B60W 50/08* (2013.01); *B60K 35/00* (2013.01)

(58) Field of Classification Search
CPC ...... B60K 35/00; H04W 48/02; H04W 48/08; H04W 4/04; H04M 1/6083; H04M 1/6091; H04M 1/72577; G06F 17/00
USPC .............. 701/36, 37, 465; 340/426.1, 426.11, 340/905
See application file for complete search history.

(56) References Cited

U.S. PATENT DOCUMENTS

| | | | |
|---|---|---|---|
| 5,394,136 A | 2/1995 | Lammers et al. | |
| 6,026,784 A | 2/2000 | Weisman et al. | |
| 6,225,890 B1 | 5/2001 | Murphy | |
| 6,366,848 B1 | 4/2002 | Gustavsson | |
| 6,701,234 B1 | 3/2004 | Vogelsang | |
| 7,024,306 B2 | 4/2006 | Minami et al. | |
| 7,027,621 B1 | 4/2006 | Prokoski | |
| 7,375,624 B2 | 5/2008 | Hines et al. | |
| 7,627,422 B2 | 12/2009 | Adamczyk et al. | |
| 7,782,181 B2 | 8/2010 | Hines et al. | |
| 8,706,349 B2 * | 4/2014 | Rector et al. .................... | 701/36 |
| 8,751,104 B2 * | 6/2014 | Hermann et al. ............... | 701/36 |
| 2003/0182033 A1 | 9/2003 | Underdahl et al. | |
| 2004/0210353 A1 | 10/2004 | Rice | |
| 2006/0038690 A1 | 2/2006 | Shmerling et al. | |
| 2008/0243558 A1 | 10/2008 | Gupte | |
| 2009/0210295 A1 | 8/2009 | Edholm et al. | |
| 2010/0004818 A1 | 1/2010 | Phelan | |
| 2010/0045451 A1 | 2/2010 | Periwal | |
| 2010/0045452 A1 | 2/2010 | Periwal | |
| 2011/0106370 A1 | 5/2011 | Duddle et al. | |
| 2011/0244890 A1 | 10/2011 | Lehmann et al. | |
| 2011/0254655 A1 | 10/2011 | Maalouf et al. | |
| 2012/0021386 A1 | 1/2012 | Anderson et al. | |
| 2012/0185282 A1 | 7/2012 | Gore et al. | |
| 2013/0338914 A1 * | 12/2013 | Weiss ........................... | 701/465 |

* cited by examiner

*Primary Examiner* — John Q Nguyen
*Assistant Examiner* — Aaron Smith
(74) *Attorney, Agent, or Firm* — Dierker & Associates, P.C.

(57) ABSTRACT

A method and a system for in-vehicle function control are disclosed herein. In an example of the method, an in-vehicle controller recognizes that a predetermined driver is operating a vehicle. The in-vehicle controller receives data from at least one vehicle system, the data being indicative of a driving behavior of the predetermined driver. The in-vehicle controller compares the data with any of i) positive metrics or ii) negative metrics to categorize the driving behavior. In response to the categorized driving behavior, a signal is provided. In response to the signal, access is granted to any of (i) an infotainment function or (ii) an increased number or range associated with an infotainment function, if the categorized driving behavior is associated with a predetermined number of the positive metrics.

16 Claims, 2 Drawing Sheets

METHOD AND SYSTEM FOR IN-VEHICLE FUNCTION CONTROL

TECHNICAL FIELD

The present disclosure relates generally to a method and system for in-vehicle function control.

BACKGROUND

Vehicles may be equipped with telematics units or other in-vehicle controllers that enable hands free calling, vehicle tracking, navigation instruction transmission, and other like features. Telematics units or other in-vehicle controllers may also be configured to activate vehicle settings that are personal to the vehicle user. A user may select desirable settings and configure the telematics unit or other in-vehicle controller from within the vehicle or remotely from the vehicle (e.g., via an Internet-enabled program).

SUMMARY

A method and a system for in-vehicle function control are disclosed herein. In an example of the method, an in-vehicle controller recognizes that a predetermined driver is operating a vehicle. The in-vehicle controller receives data from at least one vehicle system, the data being indicative of a driving behavior of the predetermined driver. The in-vehicle controller compares the data with any of i) positive metrics or ii) negative metrics to categorize the driving behavior. In response to the categorized driving behavior, a signal is provided. In response to the signal, access is granted to any of (i) an infotainment function or (ii) an increased number or range associated with an infotainment function, if the categorized driving behavior is associated with a predetermined number of the positive metrics.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method disclosed herein may be used to reward drivers in real-time with infotainment-related privileges or other in-vehicle or vehicle usage privileges. In the examples disclosed herein, data from vehicle system(s) is monitored and evaluated in order to determine whether the driving behavior exhibited by the driver qualifies the driver for an in-vehicle or vehicle usage reward. The categorization of the driving behavior may be based upon the data that is received during a particular driving event, and this data may be used either alone or in combination with the driver's driving behavior history. The use of real-time driving event data and associated rewards may provide an incentive for the vehicle driver to exhibit a particular driving behavior, and may also provide positive reinforcement for the vehicle driver when he/she does exhibit the particular driving behavior.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

Figure 1:
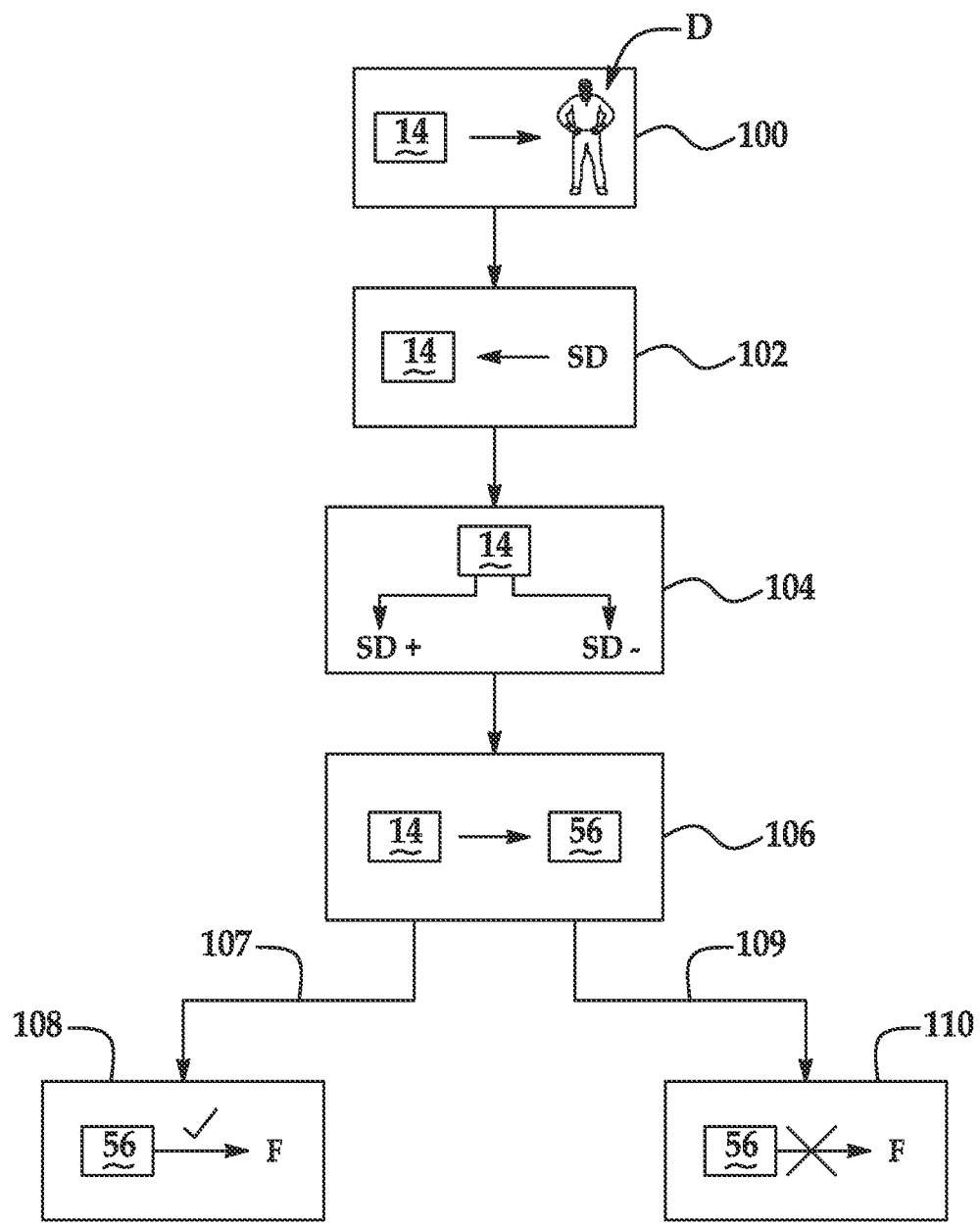
FIG. 1 is a schematic flow diagram illustrating an example of the method for in-vehicle function control.
Figure 2:
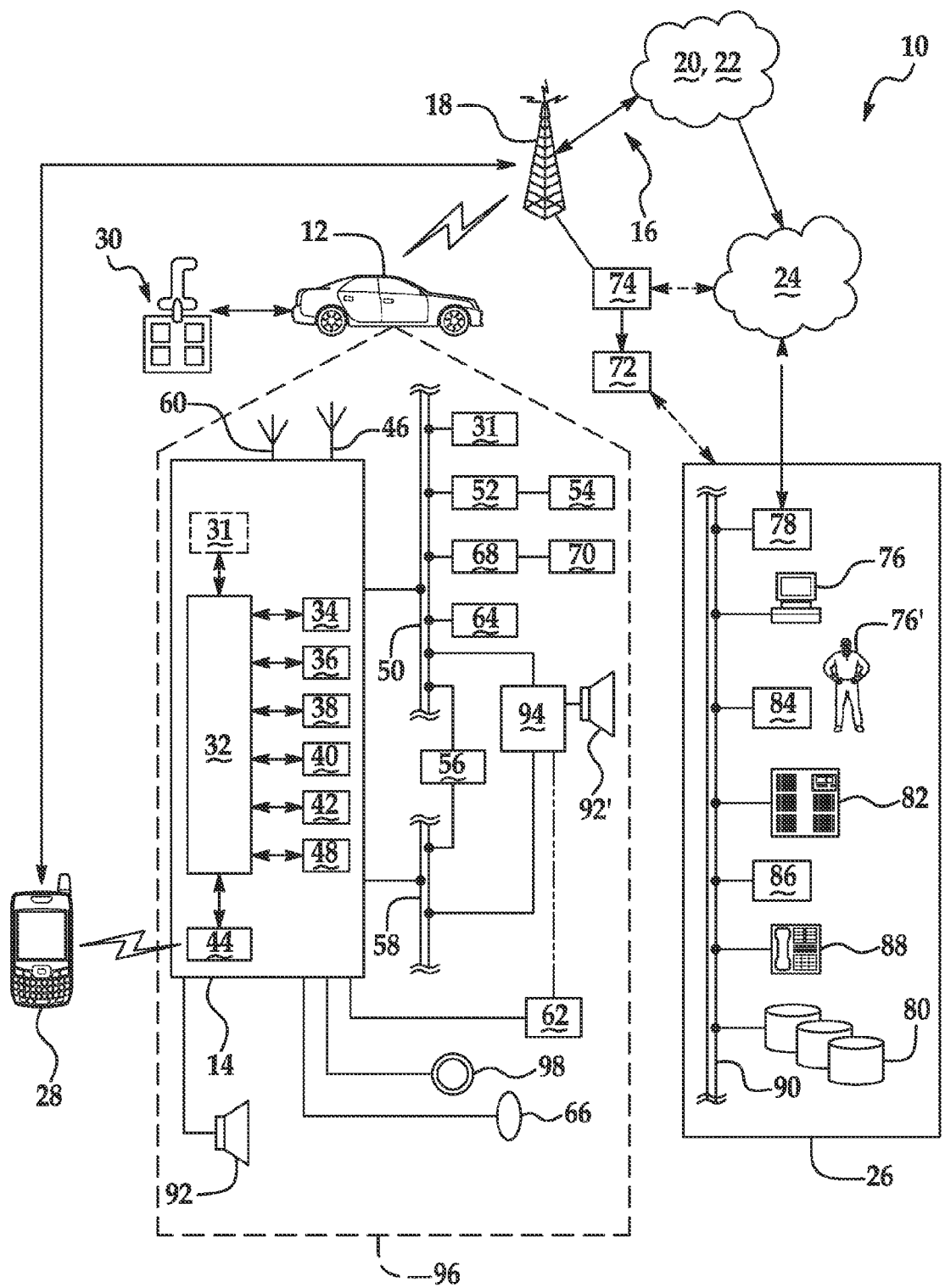
FIG. 2 is a schematic diagram depicting an example of a system for in-vehicle function control.

FIG. 1 depicts an example of the in-vehicle function control method, which may be performed to monitor the driving behavior of the vehicle driver D during a driving event in order to potentially reward the driver D for his/her driving behavior, and FIG. 2 depicts an example of a system 10 that may be used to carry out the method. FIGS. 1 and 2 will be discussed together throughout the following description.

It is to be understood that the overall architecture, setup and operation, as well as many of the individual components of the system 10 shown in FIG. 2 are generally known in the art. It is to be understood, however, that additional components and/or other systems not shown here could employ the method(s) disclosed herein.

As shown in FIG. 2, the system 10 includes a mobile vehicle 12, an in-vehicle controller 14 operatively disposed in the mobile vehicle 12, a carrier/communication system 16 (including, but not limited to, one or more cell towers 18, one or more base stations 20 and/or mobile switching centers (MSCs) 22, and one or more service providers (not shown) including mobile network operator(s)), one or more land networks 24, and one or more call centers 26.

Vehicle 12 is a mobile vehicle, such as a motorcycle, car, truck, recreational vehicle (RV), boat, plane, etc., and is equipped with suitable hardware and computer-readable instructions that enable it to communicate (e.g., transmit and/or receive voice and data communications) over the carrier/communication system 16. In an example, the carrier/communication system 16 is a two-way radio frequency communication system. The wireless carrier/communication system 16 may be used to establish communication between the in-vehicle controller 14 and any outside communications device or system (e.g., a mobile phone, a landline telephone, component(s) at the call center 26).

Examples of the method disclosed herein may be initiated by an ignition on event. When the vehicle ignition is turned on, the in-vehicle controller 14 initiates the method and attempts to recognize the current vehicle driver D. This is shown at reference numeral 100 in FIG. 1. Recognition of the current vehicle driver D may be accomplished in a variety of ways. In an example, the in-vehicle controller 14 in conjunction is capable of identifying the vehicle driver D. As will be discussed in further detail below, the in-vehicle controller 14 may identify the vehicle driver D using a mobile communications device 28 operatively connected to the in-vehicle controller 14, a key fob 30 used for vehicle entry and/or vehicle operation, video recognition, voice recognition, an off-board server (e.g., a server 82 at the call center 26) in communication with the in-vehicle controller 14, or the like.

The in-vehicle controller 14 is an on-board vehicle dedicated communications device (e.g., a telematics unit) that includes hardware components that are capable of running computer-readable instructions, which are embodied on non-transitory, tangible computer-readable media. The computer-readable media may include any one of many physical media such as, for example, electronic, magnetic, optical, electro-magnetic, or semiconductor media. More specific examples of suitable computer-readable media include hard drives, a random access memory (RAM), a read-only memory (ROM), an erasable programmable read-only memory (EPROM), or a portable CD, DVD, or flash drive. Examples of the computer-readable instructions may be for recognizing the driver D, for comparing data with metrics to categorize driving behavior, or for carrying out other steps of the method disclosed herein.

To identify the vehicle driver D, the in-vehicle controller 14 may include or otherwise be in connection with (via a vehicle bus 50) a module 31, which may be any computational box that is configured to make the identification(s). Examples of the module 31 include a body control module (BCM), a human machine interface (HMI), and/or the like. In some instances, the module 31 includes a speech-recognition unit and/or an in-vehicle camera.

The in-vehicle controller 14 also provides a variety of other services, both individually and through its communication with the call center 26. In an example, the call center 26 is a facility that may be owned and operated by an in-vehicle controller service provider (e.g., a telematics service provider). The in-vehicle controller 14 generally includes an electronic processing device 32 operatively coupled to one or more types of electronic memory 34, a cellular chipset/component 36, a wireless modem 38, a navigation unit containing a location detection (e.g., global positioning system (GPS)) chipset/component 40, a real-time clock (RTC) 42, a short-range wireless communication network 44 (e.g., a BLUETOOTH® unit), and/or a dual mode antenna 46. Generally, dual mode antenna 46 services the location detection chipset/component 40 and the cellular chipset/component 36. It is to be understood that the in-vehicle controller 14 may be implemented without one or more of the above listed components (e.g., the real-time clock 42). It is to be further understood that in-vehicle controller 14 may also include additional components and functionality as desired for a particular end use.

The electronic processing device 32 (also referred to herein as the processor 32) may be a micro controller, a controller, a microprocessor, a host processor, and/or a vehicle communications processor. In another example, electronic processing device 32 may be an application specific integrated circuit (ASIC). Alternatively, electronic processing device 32 may be a processor working in conjunction with a central processing unit (CPU) performing the function of a general-purpose processor. In an example, the electronic processing device 32 is capable of running software programs having computer-readable code/instructions to initiate and/or perform one or more steps of the method disclosed herein. For instance, the software programs may include computer-readable instructions for comparing data received by the in-vehicle controller 14 with preset metrics stored in the memory 34.

The location detection chipset/component 40 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 36 may be an analog, digital, dual-mode, dual-band, multi-mode and/or multi-band cellular phone. The cellular chipset-component 36 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 32 is the previously mentioned real-time clock (RTC) 42, which provides accurate date and time information to the in-vehicle controller 14 hardware and software components that may require and/or request date and time information. In an example, the RTC 42 may provide date and time information periodically, such as, for example, every ten milliseconds.

The electronic memory 34 of the in-vehicle controller 14 may be configured to store computer-readable instructions to be executed by the processor 32, data associated with the various systems of the vehicle 12 and/or the various drivers of the vehicle, positive and/or negative metrics for categorizing driving behavior, vehicle operations, vehicle user preferences and/or personal information, and the like.

In some examples, the in-vehicle controller 14 may also include a vehicle data upload (VDU) system 48, which is configured to receive raw vehicle data from the vehicle bus 50 (discussed further below), packetize the data, and upload the packetized raw data to the call center 26 or another external entity (such as the vehicle owner). In one example, the VDU system 48 is operatively connected to the processor 32 of the in-vehicle controller 14, and thus is in communication with the external entity via the bus 50 and the carrier/communication system 16. In another example, the VDU 48 may be the in-vehicle controller's central data system that can include a modem, a processor, and an on-board database. The database can be implemented using a separate network attached storage (NAS) device or can be located elsewhere, such as in memory 34, as desired. The VDU system 48 has an application program that handles the vehicle data upload processing, including communication with any external entity and the setting and processing of triggers which initiate a data upload event.

The in-vehicle controller 14 provides numerous services alone or in conjunction with the call center 26, some of which may not be listed herein, and is configured to fulfill one or more user or subscriber requests. Several examples of these services include, but are not limited to: turn-by-turn directions and other navigation-related services provided in conjunction with the GPS based chipset/component 40; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an in-vehicle infotainment controller 56 operatively connected to the in-vehicle controller 14 via vehicle bus 50 and an audio bus 58. The listed services are by no means an exhaustive list of all the capabilities of in-vehicle controller 14, but are simply an illustration of some of the services that the in-vehicle controller 14 is capable of offering.

As mentioned above, the in-vehicle controller 14 is capable of recognizing the then-current driver D of the vehicle 12 in a variety of ways. In an example, the in-vehicle controller 14 may identify the vehicle driver D using the mobile communications device 28 of the driver D. When the driver D brings his/her mobile communications device 28 into the vehicle 12, the short range wireless communication network 44 (e.g., the BLUETOOTH® unit) may pair the mobile communications device 28 with the in-vehicle controller 14. In an example, the in-vehicle controller 14 continuously monitors for the presence of the mobile device 28 (which may be identified by a unique media access control (MAC) identifier) using a short range wireless antenna 60, and attempts to pair the device 28 with the in-vehicle controller 14 upon recognizing the MAC. The mobile device 28 and the in-vehicle controller 14 are actually paired when the in-vehicle controller 14 and the mobile device 28 exchange security codes/passwords with each other. Pairing enables the in-vehicle controller 14 and the mobile device 28 to communicate typically under a secured connection. Once the two units 14, 28 have been initially paired, the in-vehicle controller 14 can directly communicate with the mobile device 28 if desired.

During the initial pairing process, the user of the mobile communications device 28 may have the opportunity to enter identification information that will associate him/her with the mobile communications device 28. This identification information may be communicated to and stored in the in-vehicle controller 14. During subsequent pairings, the in-vehicle controller 14 will recognize device 28 and the user associated with the device 28. When the mobile communications device 28 is the only device recognized in the vehicle 12 after an ignition on event, the in-vehicle controller 14 is capable of concluding that the user of the mobile communications device 28 is also the vehicle driver D. However, when multiple mobile communications devices 28 are recognized in the vehicle 12 after an ignition on event, the in-vehicle controller 14 may be configured to contact one or more of the users associated with the respective devices 28 to determine which of the users is the then-current driver D. For example, when both a mom and a child of driving age have entered the vehicle 12, the in-vehicle controller 14 recognizes the respective mobile devices 28 of both the mom and the child. In this example, the in-vehicle controller 14 may transmit a message to an application on the mobile device 28 of the mother asking if she is the driver D. In this same example, the in-vehicle controller 14 may otherwise transmit a message, using an in-vehicle display 62, to all in-vehicle occupants asking which of the occupants is the driver D. The in-vehicle controller 14 may also be configured to utilize the location of the mobile communications device 28 to triangulate who is where within the vehicle cabin and/or utilize seat weight sensor data to determine who is where within the vehicle cabin. Multiple techniques may be combined in order to correctly identify the driver D.

The display 62 may be operatively directly connected to or in communication with the in-vehicle controller 14, or may be part of the in-vehicle infotainment controller 56. Examples of the display 62 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

In another example, the in-vehicle controller 14 may identify the vehicle driver D using the module 31 and the key fob 30. In this example, the module 31 (using the processor 32 or its own processor) executes computer-readable instructions for identifying the key fob 30 that had previously been associated with the driver D. A single key fob 30 may, for example, be personalized for a single vehicle driver D so that the module 31 can identify the driver D when the key fob 30 is used. In instances where the vehicle 12 has several possible drivers D, each driver D may have his/her own personal key fob 30 that is recognizable by the module 31. In an example, each key fob 30 includes an internal processor (not shown) and a memory (also not shown) configured to store information personal to the vehicle driver previously associated or registered with the key fob 30.

When the key fob 30 is actuated by the vehicle driver D to initiate a vehicle function and when the electronics of the vehicle 12 are started, the in-vehicle controller 14 queries the module 31 for information associated with the key fob 30 that was used to actuate the previously-described vehicle function. The module 31 responds to the query by identifying a rolling code of the key fob 30, synchronizing the rolling code with an identifier of the key fob 30, and then accessing the vehicle driver information associated with the identified key fob 30. The module 31 thereafter transmits a message back to the in-vehicle controller 14 over the vehicle bus 50 with the identifier of the key fob 30 and the information about the driver D associated with the key fob 30. Alternatively, the module 31 may place a message on the vehicle bus 30 containing the identifier and the driver information, and the in-vehicle controller 14 may retrieve the message.

In instances where the module 31 is embedded in or integrated with the in-vehicle controller 14, the in-vehicle controller 14 itself identifies the key fob 30 that was used to actuate the vehicle function and the driver associated with the key fob 30. This may be accomplished by the in-vehicle controller 14 in the same way as the module 31 (i.e., by identifying the rolling code of the key fob 30, and then synchronizing the rolling code with the key fob identifier, and then accessing the information associated with the identified key fob 30).

The in-vehicle controller 14 may also be capable of recognizing the driver D using video recognition or voice recognition. Video recognition may be accomplished by spatially recognizing the vehicle driver's physical features, such as the shape, color, and features of the driver's face. In an example, a facial imaging camera 64 may be positioned inside the vehicle 12 such that the camera 64 faces or is operable to face the driver's seat. For example, the camera 64 may be positioned on the dashboard, on the rearview mirror, on the steering wheel, or the like. The camera 64 may be used to take images or video of the person that is then-currently occupying the driver's seat. In some cases, the camera 64, via a processor operatively associated therewith (not shown) or via the processor 32, may have been trained to recognize the driver. For example, each time the vehicle 12 is powered on, the camera 64 captures an image or video of the vehicle driver D. Upon capturing the image or video, the in-vehicle controller 14 may request that the vehicle driver D input identifying information, to be associated with the image or video, using a microphone 66, the display 62, or another input device operatively connected to the in-vehicle controller 14. This information may be stored with the image in the memory 34 or a memory of the camera 64. At the initiation of a driving event (e.g., ignition on), the camera 64 can ascertain an image of the vehicle driver D and cross-check the image with images and information previously stored to identify the vehicle driver D.

Voice recognition may be accomplished by requesting the vehicle driver D to verbally recite an utterance into the microphone 66 that is operatively connected to the in-vehicle controller 14. The utterance may include information identifying the person who is occupying the driver's seat, such as the persons' name. The in-vehicle controller 14 may then use the person's name to identify the driver. In another example, the in-vehicle controller 14 may use voice recognition software to recognize the person who is speaking based on a comparison of the person's utterances with a previously stored voice print of the user.

The previously mentioned microphone 66 provides an in-vehicle occupant with a means for inputting verbal or other auditory commands, and can be equipped with an embedded voice processing unit utilizing human/machine interface (HMI) technology known in the art. Conversely, speaker(s) 92, 92' provides verbal output to the vehicle occupants and can be either a stand-alone speaker 92 specifically dedicated for use with the in-vehicle controller 14 or can be part of a vehicle audio component 94 (see speaker 92'). Microphone 66 and speaker(s) 92, 92' enable vehicle hardware 96 and the call center 26 to communicate with the occupants through audible speech.

The audio component 94 is operatively connected to the vehicle bus 50 and the audio bus 58. The audio component 94 receives analog information, rendering it as sound, via the audio bus 58. Digital information is received via the vehicle bus 50. The audio component 94 provides AM and FM radio, satellite radio, CD, DVD, multimedia and other like functionality in conjunction with the infotainment controller 56. The audio component 94 may contain a speaker system, or may utilize speaker 92, 92' via arbitration on vehicle bus 50 and/or audio bus 58.

The vehicle hardware 96 also includes one or more buttons, knobs, switches, keyboards, and/or controls 98 for enabling a vehicle occupant to activate or engage one or more of the vehicle hardware components. In one example, one of the buttons 98 may be an electronic pushbutton used to initiate voice communication with the call center 26 (whether it be a live advisor 76 or an automated call response system 76') to request emergency services, for example.

The driver D may also be recognized by an off-board server, such as a server 82 at the call center 26. In-vehicle parameters (e.g., seat position, mirror positions, etc.) are often unique to a particular driver D. The in-vehicle controller 14 may communicate these parameters to the server 82, which can access driver profiles to determine who the driver D is based upon the parameters.

Any combinations of the driver identification methods may also be used. Still further, other driver identification methods not discussed herein are believed to be within the scope of the instant disclosure.

In any instance, the owner of the vehicle 12 may be contacted to verify who is or had been driving during a particular driving event.

Once the driver D is recognized, the information about who is driving during this particular driving event may be transmitted to the call center 26. This may be desirable so that the call center 26 (using one or more of its various components which are discussed below) may store vehicle data SD transmitted from the vehicle 12 during the driving event, and/or may retrieve a driving history for the driver D and transmit the driving history to the vehicle 12 during the driving event.

Referring back to the method shown in FIG. 1, in an example, once the driver D is recognized, the in-vehicle controller 14 enters a monitor mode. In another example, the in-vehicle controller 14 may enter monitor mode at the onset of a driving event and before the driver D is recognized. During monitor mode, data SD from at least one vehicle system is received at the in-vehicle controller 14, as shown at reference numeral 102 of FIG. 1. When the in-vehicle controller 14 is continuously in monitor mode after an ignition on event, the data SD collected may not be transmitted outside of the vehicle 12 (e.g., to the call center 26 or another third party) until after the driver D is identified.

The in-vehicle controller 14 is connected to the various vehicle systems through the vehicle bus 50. The vehicle bus 50 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus 50 enables the vehicle 12 to send signals (i.e., real-time bus messages) from the in-vehicle controller 14 to various units of equipment and systems both outside the vehicle 12 and within the vehicle 12 to perform various functions, such as unlocking a door, executing personal comfort settings, and/or the like. The vehicle bus 50 also enables the vehicle 12 to receive signals at the in-vehicle controller from various units of equipment and systems both outside the vehicle 12 and within the vehicle 12.

While the in-vehicle controller 14 may receive a variety of data SD from a variety of vehicle systems, the data that is of particular interest in the method(s) disclosed herein is data SD that is indicative of the driving behavior of the driver D. Examples of this data SD include vehicle boundary data, following distance data, vehicle speed data, vehicle braking data, vehicle acceleration and deceleration data, and/or lane drift data. It is to be understood that other data SD indicative of driving behavior may be received and utilized in the method(s) disclosed herein. The data SD that is available and utilized may depend, at least in part, on the sensor suite that is present in the vehicle 12.

As previously mentioned, the data SD is received by the in-vehicle controller 14 from one or more vehicle systems. The vehicle systems may include the crash and or collision sensors 54 and other vehicle sensors 70. The crash sensors 54 provide information to the in-vehicle controller 14 via the crash and/or collision detection sensor interface 52 regarding the severity of a vehicle collision, such as the angle of impact and the amount of force sustained. The vehicle crash and/or collision detection sensor interface 52 is/are operatively connected to the vehicle bus 50. The other vehicle sensors 70, connected to various sensor interface modules 68, are also operatively connected to the vehicle bus 50. Examples of the other vehicle sensors 70 include, but are not limited to, gyroscopes, accelerometers, magnetometers, emission detection and/or control sensors, lane departure sensors (e.g., video sensors, laser sensors, infrared sensors, etc.), speed sensors, following distance sensors (e.g., radar sensors, video sensors, infrared sensors, ultrasonic sensors, etc.), braking activity sensors, environmental detection sensors, and/or the like. Examples of the sensor interface modules 68 include powertrain control, climate control, body control, and/or the like.

During a driving event, the sensors 54, 70 continuously collect real-time data SD. The data SD may be collected continuously or at predetermined time intervals (e.g., every 30 seconds, every minute, every five minutes, etc.) and then sent to the in-vehicle controller 14 at the end of the predetermined time interval. As such, in a single driving event, the respective sensors 54, 70 may send multiple data messages. Each message may be associated with a time stamp so that the in-vehicle controller 14 is aware of when the data SD was collected. In an example, the data SD is transmitted in the form of a message to the in-vehicle controller 14 over the vehicle bus 50. In another example, the data SD is placed as a message on the vehicle bus 50 and the in-vehicle controller 14 retrieves the message.

The data SD is processed in order to classify the overall driving behavior. In an example, the data SD received by the in-vehicle controller 14 is compared with positive metrics and/or negative metrics in order to categorize the driving behavior of the driver D. This is shown at reference numeral 104 of FIG. 1. All received data SD may be input into an algorithm (run by the processor 32) which evaluates the data SD and runs comparisons with previously set positive and/or negative metrics, and then uses the algorithm outputs in order to classify the driving behavior. As such, in many instances, no one positive or negative metric alone would define the driving behavior.

The positive and negative metrics may be identified using threshold values. In some instances, the threshold value is a desirable minimum value, and any value that exceeds that threshold value may be considered a positive metric while any value that is below that threshold may be considered a negative metric. For example, if a minimum following distance is set at five feet, any distance greater than five feet is a positive metric and any distance equal to or less than five feet is a negative metric. In other instances, the threshold value is a desirable maximum value, and any value that exceeds that threshold value may be considered a negative metric while any value that is below that threshold may be considered a positive metric. For example, a maximum number of lane drifts for any driving event (regardless of its duration) may be set at five. In this example, any number of lane drifts less than five is considered a positive metric, and any number of lane drifts equal to or greater than five is considered a negative metric.

The positive and negative metrics may also be identified using standard curves. For example, every acceleration/deceleration curve created for the driver D could be compared to standard curves for acceleration/deceleration at various speeds. If the curves match the standard, the acceleration/deceleration may be classified as corresponding with a positive metric, and if the curves do not match the standard, the acceleration/deceleration may be classified as corresponding with a negative metric. For example, if the driver D is driving at 55 mph and brakes to a complete stop, his/her curves would be compared to known safe braking curves.

The positive and negative metrics may also be identified using threshold values in conjunction with a time period. For example, excessive braking may be quantified using an acceptable number of braking events taking place within a set time period. For example, excessive braking may be defined as ten or more braking events within a 30 second time period. In this example, any number of braking events that is less than ten in the set time period is a positive metric and any number of braking events that is equal to or greater than ten within the set time period is a negative metric.

The positive and negative metrics may also be identified using ranges. For example, positive and negative metrics related to speed may be based a range surrounding the posted speed limit. If the range is set to ±5 mph of the posted speed limit, then any speed within the range is a positive metric and any speed outside of the range is a negative metric. The range may also be a geo-boundary. A preset geo-boundary may be identified for the driver D, and travel outside of the boundary will be a negative metric while travel within the boundary will be a positive metric.

Metrics may be set for one data type or for a plurality of data types. The in-vehicle controller 14 will have any metrics stored therein (e.g., in memory 34) and thus will be able to determine which data SD should be used in a comparison. The positive and/or negative metrics may be set by the manufacturer of the vehicle 12, by the owner of the vehicle 12, and/or by a parent or guardian of the driver D (who may also the owner of the vehicle 12 or has permission from the owner to set the metrics). As noted above, the various metrics may be used in combination in an algorithm in order to classify the overall driving behavior. In this regard, no one particular data type would control the classification. Rather, various data types may be individually compared with preset positive and/or negative metrics and then may be combined in order to classify the overall driving behavior.

The metrics may be set using a webpage 72, the information of which resides on computer equipment (not shown) of a host server 74. The webpage 72 may be owned and/or operated by an in-vehicle controller service provider or a vehicle manufacturer. This webpage 72 may be used, e.g., to set up the metrics for a particular driver D. Different drivers D of the same vehicle 12 may have different metrics associated therewith. For example, a vehicle owner may set no metrics for himself or his spouse, but he may set one of set metrics for his teenager driver and another set of metrics for his elderly mother.

The vehicle owner or other authorized person may access the page 72 by, e.g., submitting personal (e.g., a login ID) and authenticating information (e.g., a password, a PIN, etc.). The computer equipment used to log into the webpage 72 may also include hardware, which, for example, can receive and read a smart card for identification/authentication purposes, or can utilize biometrics for identification/authentication purposes. Once the webpage 72 has been accessed, the person accessing the webpage 72 (which is typically an authorized user of the vehicle 12) may input driver D information and select particular metrics to be associated with that driver D. A preset list of metrics may be available for selection on the webpage 72. In some instances, fillable fields may also be available to input information for defining a particular metric.

In addition, the webpage 72 may be used to register a particular key fob 30 with a particular driver D and/or to register a particular mobile communications device 28 with a particular driver D for subsequent driver identification (as discussed above). In these cases, the user submits identification information of the key fob 30 and/or mobile device 28 (e.g., its serial number, phone number, etc.), and indicates (e.g., via a mouse click on an appropriate icon or menu option on the webpage 72) to associate the key fob 30 and/or device 28 with the identified driver 30.

Any information set using the webpage 72 may be sent from the webpage 72 to the vehicle 12 for storage therein (e.g., in memory 34 or a memory of the module 31), and/or may be sent to the call center 26 for storage in its memory device(s).

The metrics may also be set by placing a call to the call center 26, and submitting a request to an advisor 76, 76' to set one or more metrics for one or more drivers D of the vehicle 12. A call to the call center 26 may also be used to register a key fob 30 and/or a mobile communications device 28 with a particular driver D of the vehicle 12. More specifically, the call is received at a switch 78, which directs the call to an appropriate advisor 76, 76' at the call center 26. Upon authorizing the caller (e.g., who accurately responds to a number of challenge questions), the caller may submit the driver information and any metrics that are to be associated with the identified driver. The call center advisor 76, 76' inputs the information and transmits the information for storage in a user profile in a database 80. In an example, the advisor 76, 76' may access the webpage 72 and input driver information and metric information (e.g., as if the caller had accessed the webpage 72 himself/herself). The information may also be transmitted to the vehicle 12 for storage therein.

The metrics are generally set until the authorized user accesses the webpage 72 (or calls the call center 26), and removes or otherwise changes the preset metrics associated with a particular driver D. The removed/changed preset conditions will take effect as soon as they are stored in the in-vehicle controller 14, and remain as active preset metrics until changed by the user, or the user's subscription with the call center 26 expires or is canceled, or for a duration predefined by the user. It is further to be understood that authorized persons alone are allowed to remove/change the preset metrics (e.g., Mom and Dad may be authorized to remove/change the preset metrics associated with their son, whereas their son may not be authorized). Those that are authorized to remove/change the preset metrics are pre-established by the user who originally set up a subscription account, or by others who the user has indicated as being authorized to change the preset metrics. Those that are authorized to remove/change the preset metrics may be identified, by the user, when the preset metrics are originally set up and/or may be added or removed at any subsequent time.

Vehicle communications (e.g., between the vehicle 12 and the webpage 72, between the vehicle 12 and the call center 26) generally utilize radio transmissions to establish a voice channel with carrier system 16 such that both voice and data transmissions may be sent and received over the voice channel. Vehicle communications are enabled via the cellular chipset/component 36 for voice communications and the wireless modem 38 for data transmission. In order to enable successful data transmission over the voice channel, wireless modem 38 applies some type of encoding or modulation to convert the digital data so that it can communicate through a vocoder or speech codec incorporated in the cellular chipset/component 36. It is to be understood that any suitable encoding or modulation technique that provides an acceptable data rate and bit error may be used with the examples disclosed herein.

A portion of the carrier/communication system 16 may be a cellular telephone system or any other suitable wireless system that transmits signals between the vehicle hardware 96 and land network 24. According to an example, the wireless portion of the carrier/communication system 16 includes one or more cell towers 18, base stations 20 and/or mobile switching centers (MSCs) 22, as well as any other networking components required to connect the wireless portion of the system 16 with land network 24. The wireless portion of the carrier/communication system 16 further includes other supporting systems, including SMSCs or short message service controllers, which are systems specifically designed to send, deliver, and/or transmit SMS or text messages to a desired destination.

A communications service provider generally owns and/or operates the carrier/communication system 16. The communications network provider includes a mobile network operator that monitors and maintains the operation of the communications network. The network operator directs and routes calls, and troubleshoots hardware (cables, routers, network switches, hubs, network adaptors), software, and transmission problems. It is to be understood that, although the communications network provider may have back-end equipment, employees, etc. located at the call center 26, the call center 26 is a separate and distinct entity from the network provider. In an example, the equipment, employees, etc. of the communications network provider are located remote from the call center 26. The communications network provider provides telephone and/or Internet services, while the telematics service provider provides a variety of telematics-related services (such as, for example, those discussed hereinabove). It is to be understood that the communications network provider may interact with the call center 26 to provide services (such as emergency services) to the vehicle user(s).

It is to be understood that various cell tower/base station/MSC arrangements are possible and could be used with the wireless portion of the system 16. For example, a base station 20 and a cell tower 18 may be co-located at the same site or they could be remotely located, or a single base station 20 may be coupled to various cell towers 18, or various base stations 20 could be coupled with a single MSC 22. A speech codec or vocoder may also be incorporated in one or more of the base stations 20, but depending on the particular architecture of the wireless network 16, it could be incorporated within an MSC 22 or some other network components as well.

Land network 22 may be a conventional land-based telecommunications network that is connected to one or more landline telephones and connects the wireless portion of the carrier/communication network 16 to the service center 26. For example, land network 22 may include a public switched telephone network (PSTN) and/or an Internet protocol (IP) network. It is to be understood that one or more segments of the land network 24 may be implemented in the form of a standard wired network, a fiber or other optical network, a cable network, other wireless networks such as wireless local networks (WLANs) or networks providing broadband wireless access (BWA), or any combination thereof.

The call center 26 is designed to provide the vehicle hardware 96 with a number of different system back-end functions. According to the example shown in FIG. 2, one call center 26 generally includes one or more switches 78, servers 82, databases 80, live and/or automated advisors 76, 76', processing equipment (or processor) 84, a communications module 86, as well as a variety of other telecommunication and computer equipment 88 that is known to those skilled in the art. These various call center 26 components are coupled to one another via a bus 90, such as one similar to the vehicle bus 50 previously described.

The processor 84, which is often used in conjunction with the computer equipment 88, is generally equipped with suitable software and/or programs enabling the processor 84 to accomplish a variety of call center 26 functions. The various operations of the call center 26 are carried out by one or more computers (e.g., computer equipment 88). The computer equipment 88 (including computers) may include a network of servers (including server 82) coupled to both locally stored and remote databases (e.g., database 80) of any information processed. In an example, the processor 84 executes computer software for receiving and processing the vehicle data SD received from the in-vehicle controller 14 during a VDU event. The processor 84 is capable of storing the vehicle data SD to generate a history of driving behavior for a particular driver D.

In an example, the communications module 86 includes suitable communications equipment that enables the call center 26 to establish a communication with an outside entity. This equipment may, for instance, be capable of handling voice calls, packet data sessions, or other messaging-based communications between the call center 26 and outside entities.

Switch 78, which may be a private branch exchange (PBX) switch, routes incoming signals so that voice transmissions are usually sent to either the live advisor 78' or the automated response system 78, and data transmissions are passed on to a modem or other piece of equipment (not shown) for demodulation and further signal processing. The modem preferably includes an encoder, as previously explained, and can be connected to various devices such as the server 82 and database 80.

It is to be appreciated that the call center 26 may be any central or remote facility, manned or unmanned, mobile or fixed, to or from which it is desirable to exchange voice and data communications. As such, the live advisor 78' may be physically present at the call center 26 or may be located remote from the call center 26 while communicating therethrough.

Again referring back to reference numeral 104 in FIG. 1, the comparison of the data SD with the positive metrics (+) and/or negative metrics (−) may be accomplished by the processor 32 of the in-vehicle controller 14 running computer-readable instructions. The appropriate raw data SD is compared to the metric(s) associated with that type of data to categorize the driving behavior. The comparison may be accomplished to determine if the data SD matches a value that is labeled as a positive metric or a negative metric. In an example, the comparison may involve a numerical comparison, where the data SD is compared with a numerical value that is respectively assigned to the positive and/or negative metric. As examples, actual speed data may be compared with an appropriate speed range to determine if the actual speed matches a positive metric or a negative metric; actual lane drift data may be compared with a maximum number of allowed lane drafts to determine if the actual number of lane drifts matches a positive metric or a negative metric; and/or actual vehicle position data may be compared with a preset geo-boundary to determine if the vehicle ever ventured outside of the geo-boundary and thus matches a negative metric.

When a single data type is analyzed, the in-vehicle controller 14 may categorize the driving behavior as good, great, acceptable, etc. if the data matches a positive metric and bad, unacceptable, etc. if the data matches a negative metric.

When multiple data types are analyzed, the in-vehicle controller 14 may determine how much of the data matches positive metrics and how much of the data matches negative metrics. This may be accomplished by an algorithm run by the processor 32. In an example, the amount of data that matches the positive metrics will indicate the category of the driving behavior. In an example, a preset number of positive metrics may have to be matched in order to categorize the driving behavior as good, great, acceptable, etc. For example, if seven different types of data SD are analyzed, a preset categorization scale may indicate that i) if 6-7 of the types of raw data SD match positive metrics, the driving behavior is to be labeled as good driving behavior (e.g., level green), ii) if 4-5 of the types of raw data SD match positive metrics (and the remainder match negative metrics), the driving behavior is to be labeled as mediocre driving behavior (e.g., level yellow), and iii) if 3 or less of the types of raw data SD match positive metrics (and the remainder match negative metrics), the driving behavior is to be labeled as bad, unacceptable, etc. driving behavior (e.g., level red).

The algorithm used to analyze the data SD may perform straight comparisons with the preset metrics and then may combine the outputs to categorize the driving behavior. The algorithm may also apply a weighting scheme to the outputs that is based upon preset driving behavior rankings and/or may evaluate driving patterns taking place during the driving event that are indicative of a particular driving behavior.

The comparison of the data may involve the data from single driving event alone. This may be used to categorize the driving behavior during the single driving event. In this example, a rolling average of the metric(s) may be taken over an integral of time. For example, the data SD received may be compared to determine the matching metric for that data. For some time period, all of the metrics may be averaged to determine the category of the driving behavior. For example, if seven different types of data SD are analyzed and data is received every 10 minutes, the in-vehicle controller 14 may be programmed to run comparisons for each data set that is received (at 10 minutes, 20 minutes, 30 minutes, etc.), and to generate an average after 30 minutes. In this example, if the first data set indicates that all seven of the data types in the first set (received after 10 minutes) match positive metrics, the second data set indicates that five of the seven data types in the second set (received after 20 minutes) match positive metrics, and the third data set indicates that six of the seven data types in the third set (received after 30 minutes) match positive metrics, then the rolling average for the 30 minute period is 6 positive metrics ((7+6+5) metrics/3 intervals). The rolling average may be re-calculated at different intervals throughout the driving event to categorize the overall driving behavior.

The comparison of the data with the metrics from the single driving event may also be combined with a driving history of the driver D in order to categorize the driving behavior. In this example, the driving history of the driver D may be sent from the call center 26 to the in-vehicle controller 14 in the form of reports including previously assigned driving behavior categories and previous comparison of data and metrics. In an example, the in-vehicle controller 14 may be programmed to generate a Gaussian average of the driving performance based upon the then-current data SD being received and compared with the previous data. This provides a cumulative driving behavior categorization. Other methods for generating a cumulative driving behavior categorization may also be utilized.

The comparison of the data with the preset metrics may also be set to take into account isolated instances that match negative metrics when a bulk of the data matches positive metrics. For example, multiple sets of data SD may be received over various time intervals, and only the data set for one of intervals includes speed, lane drift, and acceleration data that correspond with respective negative metrics. In this example, the in-vehicle controller 14 may recognize that an incident may have occurred during that particular interval since this type of behavior was not observed at any of the other time intervals. The in-vehicle controller 14 may be programmed to ignore the comparison for this time interval when categorizing the driving behavior using a rolling average.

While various examples for categorizing or classifying the driving behavior have been described herein, it is to be understood that other methods for categorization or classification may be used.

As shown at reference numeral 106 of FIG. 1, once the driving behavior is categorized, a signal is sent to the in-vehicle infotainment controller 56. The signal is indicative of the categorized driving behavior. In some instances (as shown at line 107 in FIG. 1), the signal will indicate to the in-vehicle infotainment controller 56 that access should be granted to an infotainment function F or to an increased number or range associated with an infotainment function F. In other instances (as shown at line 109 in FIG. 1), the signal will indicate to the in-vehicle infotainment controller 56 that access should continue to be denied to an infotainment function F or to an increased number or range associated with an infotainment function F. Whether the signal is a grant access signal or a deny access signal will depend upon the categorized driving behavior. For example, if the categorized driving behavior is good, great, acceptable, etc. (e.g., because the data SD matched a predetermined number of positive metrics), the signal that is sent will be a grant access signal. However, if the categorized driving behavior is mediocre or bad, unacceptable, etc. (e.g., because the data SD did not match enough, if any, positive metrics), the signal that is sent will be a deny access signal.

When the signal sent is a grant access signal, the in-vehicle infotainment controller 56 will grant the driver D access to an infotainment function F or to an increased number or range associated with an infotainment function F (as shown at reference numeral 108 in FIG. 1). It is to be understood that the driver D previously does not have access to the infotainment function F or to the increased number or range associated with an infotainment function F, and thus access to either of these is a reward for good, great, acceptable, etc. driving behavior.

The infotainment function F may be setting a preset radio station; making calls using an in-vehicle hands free calling system; connecting an external music device; in-vehicle uploading to a social media webpage; operating any of a radio or a compact disc player; availability of radio stations; location sharing for social networking; setting vehicle function ringtones; setting wall paper for the in-vehicle display 62; or combinations thereof. So, for example, when the driver D exhibits good, great, acceptable, etc. driving behavior, he or she may be notified that he/she is now allowed to set a preset radio station, to make calls using the in-vehicle hands free calling system, to connect an external music device (e.g., an MP3 player), to upload to a social media webpage from the vehicle 12, to share his/her location on the social media webpage utilizing the vehicle 12, to access previously inaccessible radio stations, to set a vehicle function ringtone, to select and set a particular wall paper for the in-vehicle display 62, and/or operate the radio and/or the compact disc player. The access to the infotainment function F may be indefinite access, limited access until the driver D exhibits less than suitable driving behavior, or limited access for the driving event.

The increased number or range associated with the infotainment function F may be a number of preset radio stations; a number of calls using an in-vehicle hands free calling system; a number of uploads to a social media webpage; a volume range; a number of accessible radio stations; a number of in-vehicle display wall papers available for selection; a number of ringtones available for selection; a time the radio can be on when driving at a particular speed; or combinations thereof. So, for example, when the driver D exhibits good, great, acceptable, etc. driving behavior, he or she may be notified that he/she is now allowed to set a certain number of preset radio stations; make a certain number of calls using the in-vehicle hands free calling system; upload a certain number of posts, tweets, etc. to a social media webpage; to adjust the volume to a range that was previously not allowed; to access a certain number of radio stations; to select from an expanded list of wall papers and/or ringtones; and/or to have the radio on for a set time period while driving at a particular speed. The access to the increased number or range associated with the infotainment function F may be indefinite access, limited access until the driver D exhibits less than suitable driving behavior, or limited access for the driving event. As an example, if the driver's driving behavior is categorized as positive driving behavior for a predetermined number of driving events, the accessibility to the radio when driving between 45 mph and 50 mph may be enabled. In this example, the speed limit at which the radio stops working may be raised from, for example, 40 mph to 50 mph.

The driver D may be notified of his/her infotainment-related reward by a preset message identifying the reward that is played over the speaker(s) 92, 92' or by a visual notification that is present on the in-vehicle display 62. This message may be delivered in real-time so that the driver D is made aware of his/her reward while the driving event takes place. In an example, the in-vehicle notification may be delivered when the in-vehicle controller 14 recognizes that the vehicle 12 is not motion (e.g., parked, at a red light, etc.). In other instances, the reward may be delivered after a vehicle ignition off event is recognized. In these instances, the message may be sent from the in-vehicle controller 14 to the driver's mobile phone or other electronic device.

When the signal sent is a deny access signal, the in-vehicle infotainment controller 56 will continue to deny the driver D access to particular infotainment functions F or to particular numbers or ranges associated with the infotainment function F.

It is to be understood that the monitoring, comparing, signal sending, and granting or denying access to infotainment-related functions may be continued throughout the driving event until an ignition off event occurs. As such, the categorization of the driving behavior may be updated multiple times throughout a single driving event. A driver D may be rewarded multiple times in a single driving event if the driving behavior is continuously categorized as good, great, acceptable, etc. Similarly, a reward that was given early on during the driving event may be taken away (i.e., access that was granted may be subsequently denied) during the same event if the driving behavior changes drastically toward the negative.

The method may be restarted for each ignition on event that is recognized.

Furthermore, a report of the data SD and the categorization of the driving behavior may be sent to the call center 26 for storage in a profile that is associated with the driver D (which may be a file within the vehicle or vehicle owner profile). The data and categorization may be used by the call center 26 to set up or update the driving history of the driver D.

Reports may also be sent to the vehicle owner and/or parent/guardian who set up the metrics for the driver D. The report may be sent in the form of a diagnostic email, a social media post, a short message service (SMS) or other text message, a multimedia message service (MMS) message, a voice message, and/or the like. In these examples, the report may be sent from the communications module 86 at the call center 26 or from the in-vehicle controller 14. The report may also be a diagnostic report that is made available on the webpage 72, where the vehicle or vehicle owner profile that is stored at the call center 26 may be accessed. The reports may be sent in real-time as the driving event is taking place, or they may be sent after the driving event has ended. The vehicle owner and/or parent/guardian who set up the metrics for the driver D may also set up parameters for the format of the reports and the method(s) by which the report(s) should be sent.

While the rewards described herein are related to infotainment-related privileges, it is to be understood that other in-vehicle rewards may be granted. For example, if the driver D is restricted to a particular geo-boundary, the reward may be an expansion of the geo-boundary. Still other examples of vehicle related or vehicle usage rewards include increasing the number of passengers allowed in the vehicle 12, increasing the time allowed to drive the vehicle 12, or other in-vehicle or vehicle centric rewards.

Example(s) of the method disclosed herein may be used to reward drivers in real-time with infotainment-related privileges, which provide an incentive for the vehicle driver to exhibit a particular driving behavior, and provide positive reinforcement for the vehicle driver when he/she does exhibit the particular driving behavior.

While several examples have been described in detail, it will be apparent to those skilled in the art that the disclosed examples may be modified. Therefore, the foregoing description is to be considered non-limiting.

The invention claimed is:

1. A method for in-vehicle function control in a vehicle, comprising:
  recognizing, by an in-vehicle controller, that a predetermined driver is operating the vehicle;
  based upon the predetermined driver, denying access to any of (i) an infotainment function or (ii) an increased number or range associated with an infotainment function;
  receiving, in the in-vehicle controller, data from at least one vehicle system, the data being indicative of a driving behavior of the predetermined driver;
  in the in-vehicle controller, comparing the data with i) positive metrics and ii) negative metrics to categorize the driving behavior;
  recognizing, from the comparison, that the data matches a predetermined number of the positive metrics;
  categorizing the driving behavior as positive driving behavior;
  providing, in response to the positive driving behavior, a signal; and
  responsive to the signal, rewarding the predetermined driver by granting access to any of (i) the previously denied infotainment function or (ii) the previously denied increased number or range associated with the infotainment function.

2. The method as defined in claim 1 wherein in conjunction with the comparing, the method further comprises analyzing a driving history of the predetermined driver to categorize the driving behavior.

3. The method as defined in claim 1 wherein the comparing of the data with the i) positive metrics and ii) negative metrics to categorize the driving behavior includes any of:
  comparing the data with a threshold value to determine if the data is associated with the positive metrics or the negative metrics;
  comparing the data with a standard curve to determine if the data is associated with the positive metrics or the negative metrics;
  comparing the data with a threshold value in conjunction with a time period to determine if the data is associated with the positive metrics or the negative metrics; or
  comparing the data with a range to determine if the data is associated with the positive metrics or the negative metrics.

4. The method as defined in claim 1 wherein:
  the infotainment function is selected from setting a preset radio station; making calls using an in-vehicle hands free calling system; connecting an external music device; in-vehicle uploading to a social media webpage; operating any of a radio or a compact disc player; availability of radio stations; location sharing for social networking; setting vehicle function ringtones; setting wall paper for an in-vehicle display; and combinations thereof; or
  the increased number or range associated with the infotainment function is selected from a number of preset radio stations; a number of calls using an in-vehicle hands free calling system; a number of uploads to a social media webpage; a volume range; a number of accessible radio stations; a number of in-vehicle display wall papers available for selection; a number of ringtones available for selection; a time the radio can be on when driving at a particular speed; and combinations thereof 5. The method as defined in claim 1, further comprising transmitting a report of the categorized driving behavior using email, a webpage, social media, or an SMS message.

6. The method as defined in claim 1, further comprising transmitting the data from the at least one vehicle system to the in-vehicle controller in the form of a real-time bus message, the real-time bus message being: related to a preset geo-boundary; related to a following distance of the vehicle; related to vehicle speed; related to vehicle braking; related to any of vehicle acceleration and deceleration; or related to lane drift.

7. The method as defined in claim 1, further comprising:
  receiving, at a webpage, a user-selected positive metric and a user-selected negative metric for the predetermined driver;
  transmitting the user-selected positive metric and the user-selected negative metric to the in-vehicle controller; and
  storing the user-selected positive metric and the user-selected negative metric in a memory associated with the in-vehicle controller.

8. The method as defined in claim 1, further comprising notifying the predetermined driver that he/she is being rewarded by playing a message within the vehicle or by displaying a message on an in-vehicle display.

9. The method as defined in claim 1 wherein the data includes speed data, following distance data, lane drift data, acceleration/deceleration data, braking data, and vehicle geographic data, and wherein the comparing of the data with the i) positive metrics and ii) negative metrics to categorize the driving behavior includes:
  comparing the speed data with a threshold speed value or an acceptable speed range to determine if the speed data matches the positive metrics or the negative metrics;
  comparing the following distance data with a minimum following distance value to determine if the following distance data matches the positive metrics or the negative metrics;
  comparing the lane drift data with a threshold lane drift value to determine if the lane drift data matches the positive metrics or the negative metrics;
  comparing an acceleration/deceleration curve created for the predetermined driver based upon the acceleration/deceleration data with a standard curve for acceleration/deceleration at a speed to determine if the acceleration/deceleration curve matches the positive metrics or the negative metrics;
  comparing the braking data with an acceptable number of braking events in a set time period to determine if the braking data matches the positive metrics or the negative metrics; and
  comparing the vehicle geographic data with a geo-boundary range to determine if the vehicle geographic data matches the positive metrics or the negative metrics.

10. The method as defined in claim 9, wherein the comparing of the data occurs at predetermined time periods during a driving event, and wherein the recognizing that the data matches the predetermined number of the positive metrics includes:
  from all of the comparing steps performed at a respective one of the predetermined time periods, determining a total number of matched positive metrics;
  determining a rolling average of the matched positive metrics for all of the predetermined time periods; and
  determining that the rolling average of the matched positive metrics meets or exceeds the predetermined number of the positive metrics.

11. A system for in-vehicle function control in a vehicle, comprising:
- computer-readable instructions, embodied on a non-transitory, tangible computer readable medium, for recognizing that a predetermined driver is operating the vehicle;
- at least one vehicle system to transmit data indicative of a driving behavior of the predetermined driver;
- an in-vehicle controller to:
  - compare the data with i) positive metrics and ii) negative metrics to categorize the driving behavior;
  - recognize, from the comparison, that the data matches a predetermined number of the positive metrics; and
  - categorize the driving behavior as positive driving behavior; and an in-vehicle infotainment controller to:
  - initially deny access to any of (i) an infotainment function or (ii) an increased number or range associated with an infotainment function;
  - receive a signal from the in-vehicle controller in response to the driving behavior being categorized as the positive driving behavior; and
  - in response to the signal, reward the predetermined driver by granting access to any of (i) the previously denied infotainment function or (ii) the previously denied increased number or range associated with an infotainment function.

12. The system as defined in claim 11 wherein the in-vehicle controller is further to analyze, in conjunction with the comparison, a driving history of the predetermined driver to categorize the driving behavior.

13. The system as defined in claim 11, further comprising computer-readable instructions, operable by the in-vehicle controller, to compare the data with a threshold value to determine if the data is associated with the positive metrics or the negative metrics.

14. The system as defined in claim 11 wherein:
the infotainment function is selected from setting a preset radio station; making calls using an in-vehicle hands free calling system; connecting an external music device; in-vehicle uploading to a social media webpage; operating any of a radio or a compact disc player; availability of radio stations; location sharing for social networking; setting vehicle function ringtones; setting wall paper for an in-vehicle display; and combinations thereof; or
the increased number or range associated with the infotainment function is selected from a number of preset radio stations; a number of calls using an in-vehicle hands free calling system; a number of uploads to a social media webpage; a volume range; a number of accessible radio stations; a number of in-vehicle display wall papers available for selection; a number of ringtones available for selection; a time the radio can be on when driving at a particular speed; and combinations thereof.

15. The system as defined in claim 11, further comprising:
- a vehicle bus operatively connected to the in-vehicle controller and the at least one vehicle system; and
- a real-time bus message including the data and transmitted by the vehicle bus, the real-time bus message being: related to a preset geo-boundary; related to a following distance of the vehicle; related to vehicle speed; related to vehicle braking; related to any of vehicle acceleration and deceleration; or related to lane drift.

16. The system as defined in claim 11, further comprising:
- a webpage in selective communication with the in-vehicle controller, the webpage to receive a user-selected positive metric and a user-selected negative metric for the predetermined driver; and
- a memory associated with the in-vehicle controller, the memory to receive and store the user-selected positive metric and the user-selected negative metric.

* * * * *